United States Patent
Streid et al.

(10) Patent No.: US 10,372,023 B2
(45) Date of Patent: Aug. 6, 2019

(54) HIGH EFFICIENCY MOTION BLUR REDUCTION

(71) Applicant: THE BOEING COMPANY, Chicago, IL (US)

(72) Inventors: Harold R. Streid, Ladue, MO (US); Carl J. Vorst, Saint Ann, MO (US)

(73) Assignee: THE BOEING COMPANY, Chicago, IL (US)

( * ) Notice: Subject to any disclaimer, the term of this patent is extended or adjusted under 35 U.S.C. 154(b) by 186 days.

(21) Appl. No.: 14/478,160

(22) Filed: Sep. 5, 2014

(65) Prior Publication Data

US 2016/0073074 A1    Mar. 10, 2016

(51) Int. Cl.
| | |
|---|---|
| H04N 5/64 | (2006.01) |
| G03B 21/14 | (2006.01) |
| G02B 5/00 | (2006.01) |
| H04N 9/31 | (2006.01) |
| G03B 21/34 | (2006.01) |

(52) U.S. Cl.
CPC ............ *G03B 21/147* (2013.01); *G02B 5/00* (2013.01); *G03B 21/34* (2013.01); *H04N 9/3114* (2013.01); *H04N 9/3155* (2013.01); *H04N 9/3182* (2013.01)

(58) Field of Classification Search
CPC ...... H04N 9/3179; H04N 9/65; H04N 9/3141; H04N 9/3197; G02B 26/04
USPC .......... 348/744, 745; 353/88; 352/134, 135, 352/204, 198, 205, 209, 212
See application file for complete search history.

(56) References Cited

U.S. PATENT DOCUMENTS

| | | | |
|---|---|---|---|
| 6,811,267 B1* | 11/2004 | Allen ................ | G03B 21/005 348/589 |
| 7,033,027 B2 | 4/2006 | Maximus | |
| 7,561,186 B2 | 7/2009 | Poon | |
| 8,845,107 B1* | 9/2014 | Coley ................ | G06T 19/20 353/28 |
| 9,134,593 B1* | 9/2015 | Worley, III ........ | G03B 21/147 |
| 2004/0012849 A1* | 1/2004 | Cruz-Uribe ........ | G02B 26/026 359/449 |
| 2004/0233276 A1* | 11/2004 | Palovuori .......... | G02B 27/2264 348/56 |
| 2005/0094109 A1* | 5/2005 | Sun .................. | G03B 21/60 353/79 |
| 2006/0192755 A1* | 8/2006 | Blythe .............. | G06F 3/0421 345/158 |
| 2006/0291014 A1* | 12/2006 | Hirata .............. | G03B 21/14 358/504 |

(Continued)

*Primary Examiner* — Jefferey F Harold
*Assistant Examiner* — Omer Khalid
(74) *Attorney, Agent, or Firm* — Patterson + Sheridan, LLP

(57) ABSTRACT

A video projector, a shutter mechanism for a video projector, and a method for reducing image blur. A shutter can include regions that are 100% transmissive to light and regions that are more than 0% transmissive (but less than 100% transmissive). The more than 0% transmissive regions raise the perceived brightness of the image relative to a shutter with 0% transmissive regions, enabling the 100% transmissive regions to be smaller. The smaller 100% transmissive regions result in reduced image blur. The more than 0% transmissive regions can include a filter that filters out certain portions of the electromagnetic spectrum of the image to provide a perceived corrected image.

19 Claims, 3 Drawing Sheets

(56) References Cited

U.S. PATENT DOCUMENTS

| | | | |
|---|---|---|---|
| 2007/0139619 A1* | 6/2007 | DeCusatis | G03B 35/00 353/7 |
| 2009/0128779 A1* | 5/2009 | Moshe | G03B 21/32 352/40 |
| 2012/0044461 A1* | 2/2012 | Chang | G03B 21/2013 353/31 |
| 2012/0315603 A1* | 12/2012 | Streid | G09B 9/36 434/37 |

* cited by examiner

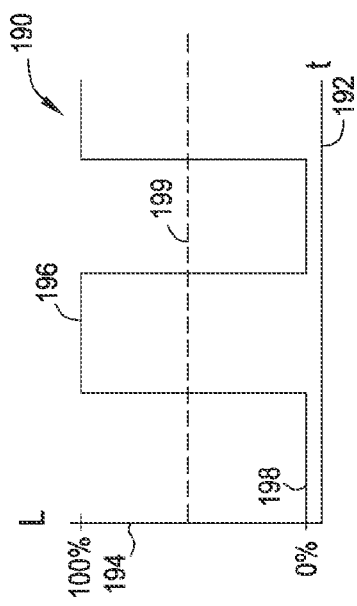
FIG. 1E
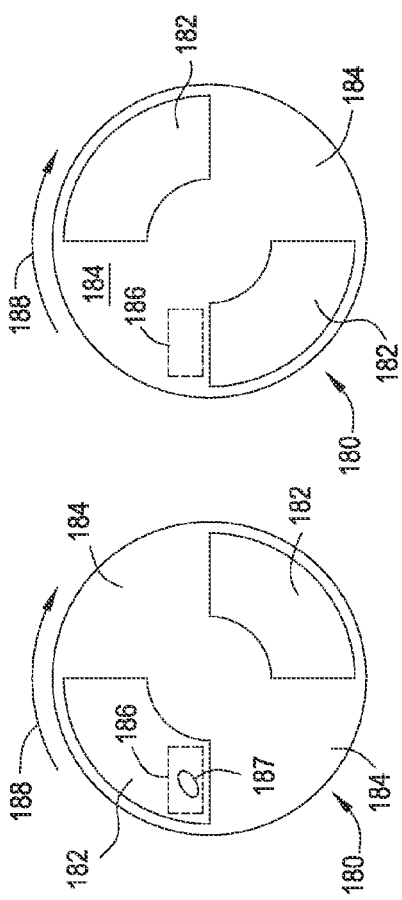
FIG. 1F
FIG. 1G
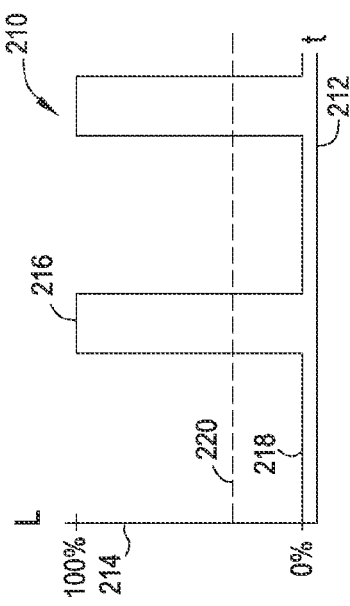
FIG. 1H
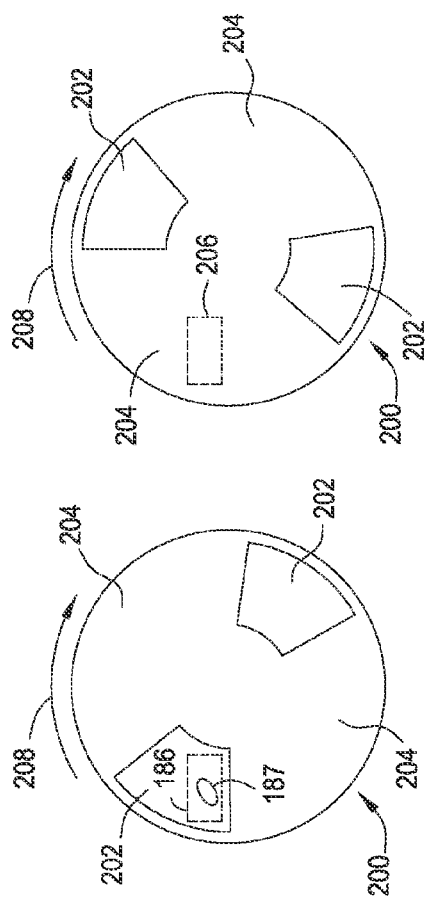
FIG. 1I
FIG. 1J

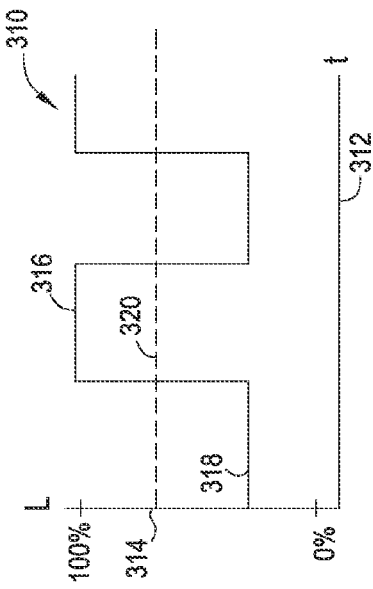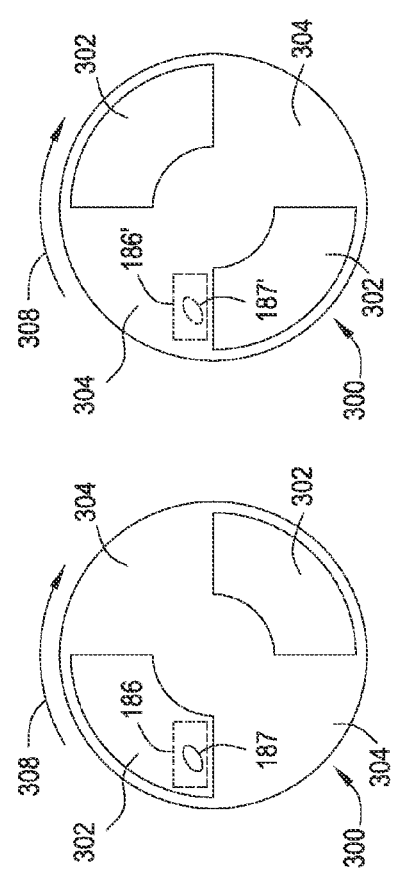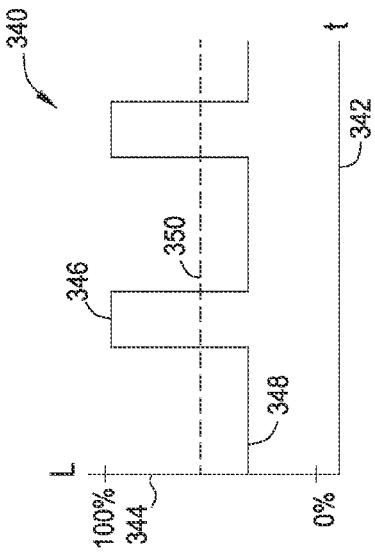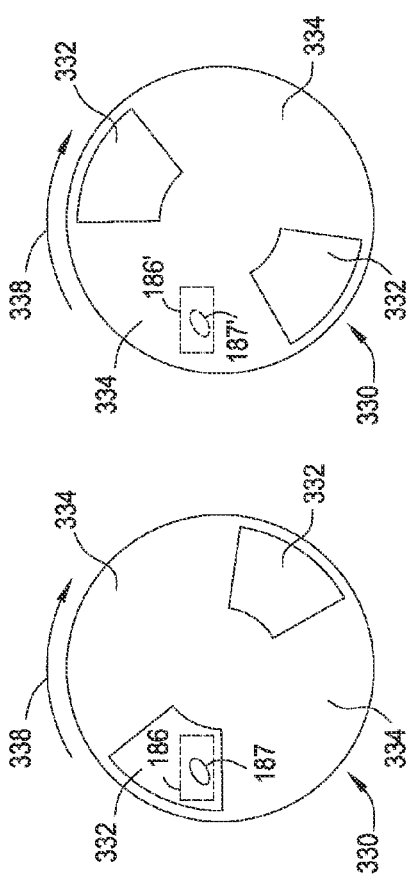
FIG. 2A  FIG. 2B  FIG. 2C
FIG. 2D  FIG. 2E  FIG. 2F

HIGH EFFICIENCY MOTION BLUR REDUCTION

FIELD

The embodiments described herein relate to shutters for video projectors, and more specifically, to shutters that reduce motion blur while improving perceived image brightness and/or offering color correction.

BACKGROUND

A video can be a display of sequential static images shown in rapid succession such that the human brain perceives the changes from one static image to the next as continuous movement. For example, motion pictures (i.e., movies) are often displayed at twenty four or forty eight frames per second. Video for television is often displayed at fifty frames per second, sixty frames per second, or multiples thereof.

Video projectors project a light source onto an imaging circuit (e.g., a liquid crystal display (LCD), liquid crystal on silicon (LCoS), or Digital Light Projection (DLP®)) to form an image and then project the image onto a surface (e.g., a display screen). Video projectors often use a shutter mechanism to shorten the time that individual sequential static images are presented to a viewer's eyes.

The shutter can also reduce motion blur perceived by a viewer. If a projected image of an object is moving across a projected image field (e.g., a baseball traveling through the air or an aircraft flying across the screen), a viewer's eye will attempt to smoothly track the perceived moving object. However, as described above, the projected image of the moving object is actually a sequence of static images. Thus, when the shutter is open during display of any one particular static image, the object is not moving. Consequently, during the brief period of time that any particular static image is displayed, the viewer's eye is moving to track the object while the object is static. As a result, the projected image is "smeared" across the viewer's retina such that the viewer perceives a blurry image.

To counteract image blur, the amount of time that the shutter is open can be decreased. By decreasing the open shutter time (i.e., the duty cycle), each static image is displayed for a shorter period of time, which reduces the "smearing" of the image on the retina as the viewer's eye attempts to track a moving object. However, decreasing the duty cycle also decreases the brightness of the displayed image.

Additionally, video images are often displayed according to a particular color specification. The specification assumes that a light output from a projector has a particular color temperature (i.e., white point) when the projector responds to the full scale input for each of the input primary colors (usually red, green, and blue). However, the projector may not output the correct color temperature when outputting at full brightness. The color temperature may be corrected by attenuating one or more of the primary colors from the light output, but such correction decreases the brightness of the displayed image.

SUMMARY

Embodiments of a video projector can include a light source, a lens, and an imaging circuit. The image circuit can be arranged in a path of light from the light source to the lens to display sequential images of a video. The video projector can also include a shutter arranged relative to the path of light. The shutter can include a first portion that is 100% transmissive and a second portion that is more than 0% transmissive. The shutter can be operated to sequentially position the first portion and then the second portion in the path of light. The second portion that is more than 0% transmissive could include a neutral density filter or a color filter that filters out light of certain colors or all colors from the path of light.

Embodiments of a shutter for a video projector can include a first portion and a second portion. The first portion can be 100% transmissive to light. The second portion can be more than 0% transmissive to light. The second portion could include a color filter that filters out light of certain colors from the path of light.

Embodiments of methods for projecting a video image can include providing a digital video image that includes a sequence of digital images. The digital video image defines a brightness level. Each digital image of the sequence of images is displayed for a predefined interval of time. The methods can include transmitting 100% of the brightness level of the digital video image for projection during a first portion of the predefined interval of time. The methods can include transmitting less than 100% and more than 0% of the brightness level of the digital video image during a remaining portion of the predefined interval of time. The method could include transmitting only some of the colors of the video image during the remaining portion of the predefined interval of time. The method can allow optimization of the output of the projector for a particular combination of brightness, color correction, and/or motion blur reduction suitable for a particular application.

BRIEF DESCRIPTION OF THE SEVERAL VIEWS OF THE DRAWINGS

FIG. 1E is a front view depiction of a shutter wheel, such as the shutter wheel shown in FIG. 1A, wherein the shutter has a 50% duty cycle, and wherein a 100% transmissive region of the shutter wheel is aligned with a path of light from the projector;

FIG. 1F is a front view of the shutter wheel of FIG. 1E, wherein a 0% transmissive region of the shutter wheel is aligned with the path of light from the projector;

FIG. 1G is a chart illustrating luminance and perceived brightness over time of the projected image of the projector and shutter of FIG. 1E;

FIG. 1H is a front view depiction of a shutter wheel, such as the shutter wheel shown in FIG. 1A, wherein the shutter has a 25% duty cycle, and wherein a 100% transmissive region of the shutter wheel is aligned with a path of light from the projector;

FIG. 1I is a front view of the shutter wheel of FIG. 1H, wherein a 0% transmissive region of the shutter wheel is aligned with the path of light from the projector;

FIG. 1J is a chart illustrating luminance and perceived brightness over time of the projected image of the projector and shutter of FIG. 1H;

FIG. 2A is a front view depiction of a shutter, wherein the shutter has a 50% duty cycle, and wherein a 100% transmissive region of the shutter wheel is aligned with a path of light from the projector;

FIG. 2B is a front view of the shutter wheel of FIG. 2A, wherein a partially transmissive region of the shutter wheel is aligned with the path of light from the projector;

FIG. 2C is a chart illustrating luminance and perceived brightness over time of the projected image of the projector and shutter of FIG. 2A;

FIG. 2D is a front view depiction of a shutter, wherein the shutter has a 25% duty cycle, and wherein a 100% transmissive region of the shutter wheel is aligned with a path of light from the projector;

FIG. 2E is a front view of the shutter wheel of FIG. 2D, wherein a partially transmissive region of the shutter wheel is aligned with the path of light from the projector; and FIG. 2F is a chart illustrating luminance and perceived brightness over time of the projected image of the projector and shutter of FIG. 2D.

DETAILED DESCRIPTION

Figure 1A:
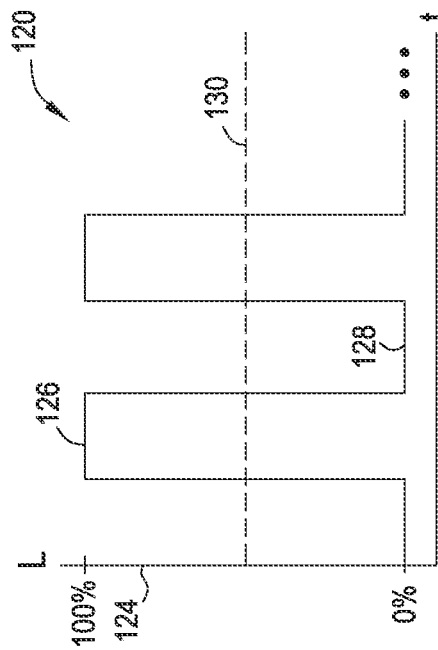
FIG. 1A is a depiction of a video projector with a shutter wheel arranged in a path of light projected by the projector.

Referring to FIG. 1A, a projector 100 can output a path of light 102 that can display an image on a screen or the like. The projector 100 can include a shutter wheel 104 arranged relative to the path of light 102. According to one embodiment, the shutter wheel 104 can be a rotatable disk that can include 100% transmissive regions 106 (meaning that all light in the path of light 102 passes through) and 0% transmissive regions 108 (meaning that all light in the path of light 102 is blocked from passing through). A person having ordinary skill in the art would understand that no material is 100% transmissive. Even air and optically pure glass will scatter a small amount of light passing through it. However, in a projector application, the amount of light scattered in such a manner is insignificant. Thus, as used herein, the term 100% transmissive ignores the small amount of light that is lost due to travel through air, transparent glass, and the like. The shutter wheel 104 can be made of an opaque material, such as metal or plastic, wherein the 100% transmissive regions are apertures or windows in the material. In various other embodiments, the shutter wheel 104 can be made of a translucent material and can include a layer arranged thereon that is opaque. The 100% transmissive regions can be apertures or windows in the translucent material or can be regions of the translucent material that do not include the opaque layer. The shutter wheel 104 can be coated with an anti-reflective coating so that when the path of light 102 impinges on the material in the 0% transmissive regions, the light is not scattered or is minimally scattered.

For illustration purposes, the shutter wheel 104 is shown outside of the projector 100. However, the shutter wheel can be located inside of the projector 100 in a manner that the 100% transmissive regions 106 and 0% transmissive regions 108 can be arranged in the path of light 102. For example, the shutter wheel can be located between a light source and imaging chip(s) in the projector 100. As another example, the shutter can be located between imaging chip(s) and a lens of the projector 100. There can be other beam steering optics that are not shown.

As indicated by arrow 110, the shutter wheel 104 can be rotated to sequentially arrange 100% transmissive regions 106 and 0% transmissive regions 108 in the path of light 102. As shown in FIG. 1A, the shutter wheel 104 includes 100% transmissive regions 106 and 0% transmissive regions 108 that have approximately equal dimensions. Thus, when the shutter wheel 104 rotates at a constant speed (indicated by arrow 110), then the shutter wheel is open (i.e., the 100% transmissive region 106 in the path of light) for approximately 50% of the time. This is referred to herein as a shutter with a 50% duty cycle. By contrast, if a shutter wheel has 100% transmissive regions that are approximately one third of the size of the 0% transmissive regions, then the shutter would be open approximately 25% of the time. This is referred to herein as a shutter with a 25% duty cycle. Similarly, if a shutter wheel has 100% transmissive regions that are approximately three times the size of the 0% transmissive regions, then the shutter would be open approximately 75% of the time. This is referred to herein as a shutter with a 75% duty cycle. The shutter wheel can be rotated by a controller 112 that can control the speed of rotation of the shutter and synchronize the shutter wheel with the images in the path of light 102.

Figure 1B:
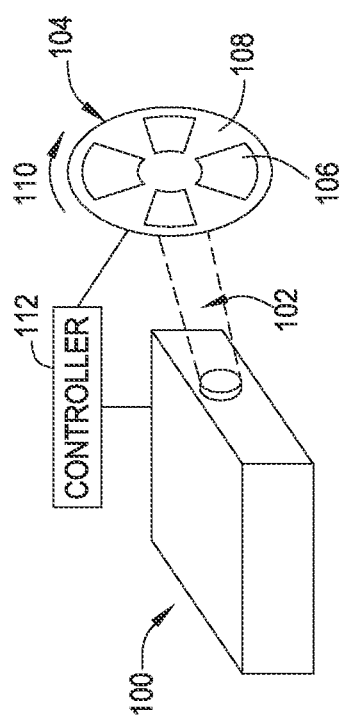
FIG. 1B is a chart illustrating luminance and perceived brightness over time of the projected image of the projector and shutter wheel of FIG. 1A.

FIG. 1B is an exemplary chart 120 of luminance (L) 124 of the path of light 102 over time (t) 122 for the projector 100 of FIG. 1A. For example, the luminance L 124 may be measured immediately downstream from the shutter wheel 104. The chart 120 indicates that during a time interval when the shutter wheel is open (i.e., when a 100% transmissive region 106 is in the path of light 102), the luminance is 100%, meaning that all or nearly all of the light from the path of light 102 passes through the 100% transmissive region 106. By contrast, during a time interval when the shutter wheel 104 is closed (i.e., when a 0% transmissive region 108 is in the path of light 102), the luminance is at 0%, meaning that none of the light from the path of light 102 passes through the 0% transmissive region 106. Since the shutter rapidly opens and closes, the human eye and brain generally does not perceive the distinct periods of 100% luminance 126 and 0% luminance 128. Rather, the human eye and brain merge the 100% luminance 126 and the 0% luminance into a perceived luminance 130 that is between the 100% luminance 126 and the 0% luminance 128. For purposes of illustration and comparison herein, perceived luminance by the human eye and brain is assumed to be a time-weighted average of the maximum luminance and the minimum luminance according to the equation: Perceived Luminance=(Max. Luminance*T1+Min. Luminance*T2)/(T1+T2), wherein T1 and T2 are times at which the luminance is at its maximum and its minimum, respectively. For example, the times T1 and T2 can be provided as fractions during a cycle of maximum luminance and minimum luminance. For a shutter with a 50% duty cycle, T1 and T2 can each equal 0.5. For a shutter with a 25% duty cycle, T1 can equal 0.25 and T2 can equal 0.75.

FIG. 1B illustrates a shutter wheel 104 with a 50% duty cycle because the periods of 100% luminance 126 are equal to the periods of 0% luminance. Thus, T1 and T2 are equal and the perceived luminance 130 may be approximately 50% luminance.

Figure 1C:
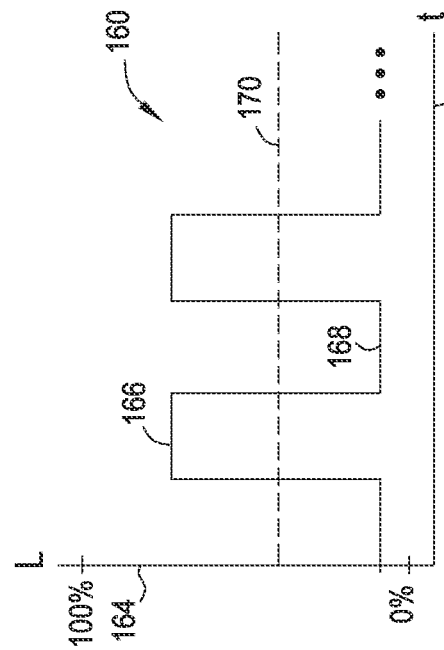
FIG. 1C is a depiction of a video projector with a liquid crystal shutter arranged in a path of light projected by the projector.
Figure 1D:
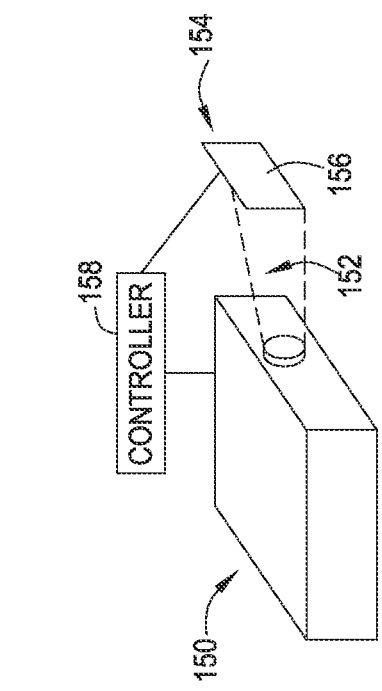
FIG. 1D is a chart illustrating luminance and perceived brightness over time of the projected image of the projector and liquid crystal shutter of FIG. 1C.

FIG. 1C illustrates a video projector 150 with a liquid crystal shutter 154 arranged in a path of light 152 of the video projector 150. The liquid crystal shutter 154 includes a liquid crystal window 156 through which the path of light 152 passes. As an example, the liquid crystal window 156 may be capable of varying between a mostly-transmissive state (e.g., between 80% and 90% transmissive) and barely-transmissive (e.g., between 5% and 10% transmissive). A controller 158 can be in communication with the liquid crystal shutter 154 to synchronize the transitions between the mostly-transmissive state and the barely-transmissive state with images in the path of light 152. An example of the variation between the transmissive states using the liquid crystal shutter 154 of FIG. 1C is show in FIG. 1D. FIG. 1D is a chart 160 showing luminance (L) 164 over time (t) 162 with a maximum luminance 166 less than the 100% luminance 126 shown in FIG. 1B. For example, the maximum luminance may be 85% luminance. Also, the minimum luminance 168 is greater than the 0% luminance 128 shown in FIG. 1B. For example, the minimum luminance 168 may be 5% luminance. As a result, the perceived luminance 170 may be 45% for the liquid crystal shutter 154, which may be lower than the perceived luminance 130 for the shutter wheel 104 shown in FIG. 1A (a perceived brightness of 50% luminance, described above).

FIGS. 1E and 1F illustrate a shutter wheel 180 with two 100% transmissive regions 182 and two 0% transmissive regions 184 arranged around the shutter wheel 180. The 100% transmissive regions 182 and 0% transmissive regions 184 are of equal size, resulting in a shutter with a 50% duty cycle. The shutter wheel 180 can be arranged relative to a path of light 186 from a projector (e.g., projector 100) such that, as the shutter wheel rotates in the direction of arrow 188, the path of light 186 passes sequentially through the 100% transmissive regions 182 (i.e., an open shutter) and then the 0% transmissive regions 184 (i.e., a closed shutter). The boundaries of the path of light 186 are illustrated with dashed lines. For illustration purposes, a moving image 187 of an object (e.g., a football flying through the air) in a projected video sequence may be moving relative to the boundaries of the path of light 186. FIG. 1E illustrates the shutter wheel 180 in a rotational position such that the path of light 186 passes through a 100% transmissive region 182, enabling the path of light 186 to pass through (e.g., to be projected on to a projector screen). In FIG. 1F, the shutter wheel 180 has rotated to a position such that the path of light 186 is blocked completely by a 0% transmissive region 184. As shown in FIG. 1F, the shutter wheel 180 has rotated from the position shown in FIG. 1E such that the entirety of the path of light 186, including the image of the moving image 187, is blocked by the 0% transmissive part. Referring now to the chart 190 of luminance (L) 194 over time (t) 195 shown in FIG. 1G, the shutter wheel 180 with a 50% duty cycle shown in FIGS. 1E and 1F may result in a perceived luminance 199 of approximately 50% luminance based on the time-weighted average being used herein for illustration and comparison purposes.

FIGS. 1H and 1I illustrate a shutter wheel 200 similar to the shutter wheel 180 shown in FIGS. 1E and 1F, except that the duty cycle has been reduced to 25%. As described above, the duty cycle may be reduced to reduce perceived motion blur of the moving image 187. Thus, the 100% transmissive regions 202 are approximately one third of the size of the 0% transmissive regions 204. As a result, as shown in FIG. 1H, if the shutter wheel 200 is rotated in the direction of arrow 208 at the same rate as shutter wheel 180, then the path of light 186 and the moving image 187 therein will pass through the 100% transmissive regions 202 for a shorter duration. Also, as shown in FIG. 1I, the path of light 186 and the moving image 187 therein will be blocked by the 0% transmissive regions 204 for a longer duration. Referring to the chart 210 of luminance (L) 214 over time (t) 212 shown in FIG. 1J, the shortened duty cycle results in shorter 100% luminance 216 duration and longer 0% luminance 218 duration. As a result, the perceived luminance 220 may be reduced relative to the perceived luminance 199 shown in FIG. 1G. For example, for a 25% duty cycle, the duration of 0% luminance 218 is three times as long as the duration of 100% luminance. Thus, the perceived luminance 220 may decrease to 25% luminance based on the time-weighted average being used herein for illustration and comparison purposes.

FIG. 2A illustrates an embodiment of a shutter wheel 300 similar to the shutter wheel 180 with a 50% duty cycle shown in FIGS. 1E and 1F, but that includes 100% transmissive regions 302 and partially transmissive regions 304. The partially transmissive regions 304 filter out some of the path of light 186. The partially transmissive regions 304 are more than 0% transmissive and less than 100% transmissive. For example, the partially transmissive regions 304 may be between 10% transmissive and 90% transmissive. As another example, the partially transmissive regions 304 may be between 20% transmissive and 80% transmissive. As another example the partially transmissive regions 304 may be between 30% transmissive and 70% transmissive. As another example, the partially transmissive regions 304 may be between 40% transmissive and 60% transmissive. In various embodiments, the shutter wheel 300 can be formed from a generally transparent material such as a plastic, acrylic, glass, or the like. A film or layer that partially filters light can be applied and/or deposited onto a surface of the transparent material. The film or layer can filter out some light that would otherwise pass through the transparent material. Regions of the shutter wheel 300 that include the film or layer can comprise the partially transmissive regions 304 of the shutter wheel 300. The 100% transmissive regions 302 can be formed by omitting the film or layer from portions of the transparent material and/or by forming apertures or windows in the transparent material (i.e., regions void of material). As shown in FIG. 2A, when a 100% transmissive region 302 is arranged in the path of light 186 with the moving image 187 therein, the path of light 186 passes through unimpeded. As shown in FIG. 2B, when a partially transmissive region 304 is arranged in the path of light 186, some of the path of light 186' and moving image 187' of the moving object passes through the partially transmissive region 304 for display on a projection screen, for example. Referring to the chart 310 of luminance (L) 314 over time (t) 312 in FIG. 2C, the path of light 186 provides 100% luminance 316 when passing through the 100% transmissive regions 302 and partial luminance 318 when passing through partially transmissive regions 304. The resulting perceived luminance 320 may be higher than the perceived luminance 199 for the shutter wheel 180 with 0% transmissive regions 184. For example, if the partially transmissive regions 304 are 50% transmissive for a 50% duty cycle shutter wheel 180, then the perceived luminance 320 may be 75% luminance based on the time-weight average being used herein for illustration and comparison purposes.

FIGS. 2D and 2E illustrate a shutter wheel 330 that is similar to the shutter wheel 300 shown in FIGS. 2A and 2B, except that the duty cycle has been reduced from 50% to 25%. Accordingly, the 100% transmissive regions 332 of the shutter wheel 330 are one third of the size of the partially transmissive regions 334. Referring to the chart 340 of luminance (L) 344 over time (t) 342 in FIG. 2F, the path of light 186 and moving image 187 provide 100% luminance 346 when passing through the 100% transmissive regions 332 and partial luminance 348 when some of the path of light 186' and moving image 187' pass through the partially transmissive regions 334. The resulting perceived luminance 350 may be less than the perceived luminance 320 for the shutter wheel 300 with the 50% duty cycle. However, the perceived luminance 350 may be higher than the perceived luminance 220 for the shutter wheel 200 with a 25% duty cycle and 0% transmissive regions 204.

FIGS. 2D and 2E illustrate a shutter wheel 330 in which the physical size of 100% transmissive regions 332 have been reduced (relative to the size of the 100% transmissive regions 302 shown in FIGS. 2A and 2B) to decrease the duty cycle. Referring again to FIGS. 2A and 2B, the duty cycle of the shutter wheel 300 may be reduced by varying the rotational speed of the shutter wheel 300 at different rotational positions. For example, the shutter wheel 300 may be rotated at a first speed (in the direction of arrow 308) when the 100% transmissive region is in the path of the path of light 186 and at a second speed (in the direction of arrow 308) when the partially transmissive regions 304 are in the path of the path of light 186. In instances in which the second speed is slower than the first speed, the duty cycle is effectively decreased because the partially transmissive regions 304 are in the path of the path of light 186 for longer intervals than the 100% transmissive regions 302. In instances in which the first speed is slower than the first speed, the duty cycle is effectively increased because the 100% transmissive regions 302 are in the path of the path of light 186 for longer intervals than the partially transmissive regions 304.

By controlling the degree of transmissiveness of the partially transmissive regions 304 or 334, a target perceived brightness may be achieved for a given shutter duty cycle. For example, for the shutter wheel 200 with a 25% duty cycle to have the same perceived brightness as the 50% duty cycle shutter wheel 180 with 0% transmissive regions 184, the partially transmissive regions 204 could be approximately 33% transmissive. According to the time-weighted average used herein for illustration and comparison purposes, a 25% duty cycle shutter wheel with 33% transmissive partially transmissive regions will result in a perceived luminance 350 of approximately 50% luminance.

In various instances, the partially transmissive regions of a shutter wheel may include several regions of different degrees of transmissiveness. For example, at a border between a 100% transmissive region (e.g., 100% transmissive region 302 in FIG. 2A) and a partially transmissive region (e.g., partially transmissive region 304 in FIG. 2A), the partially transmissive region may include a first region that is 75% transmissive. The center of the partially transmissive region may include a second region that is only 33% transmissive. The several regions within a partially transmissive region can include a smooth transition from one degree of transmissiveness to the next. In various embodiments, the 100% transmissive regions and the partially transmissive regions can be discontinuous or not touching one another. For example, the partially transmissive regions (e.g., partially transmissive regions 304 in FIG. 2A) may be separated from 100% transmissive regions (e.g., 100% transmissive regions 302 in FIG. 2A) by a 0% transmissive region.

In various embodiments, the partially transmissive regions of a shutter wheel (e.g., partially transmissive regions 304 of shutter wheel 300) can comprise a neutral density filter, meaning that all colors of light are filtered equally. In various other embodiments, the partially transmissive regions of the shutter wheel can comprise an electromagnetic spectrum filter, meaning that only certain portions of the electromagnetic spectrum (e.g., colors) are filtered, thereby altering the image output by a projector. Often times, an image is prepared based on an assumed color temperature for a light source that is illuminating the image. For example, a projected image may comprise three separate copies of the same image that are precisely displayed on top of one another. A first copy of the image may be blue, a second copy may be yellow, and a third copy may be red, for example. The resulting combined image will have a certain color temperature. If the color temperature is cool, then a white region of the image may have a blue tint. Alternatively, if the color temperature is warm, then a white region of the image may have a yellow or red tint. An image for display by a projector may be prepared assuming that the color temperature of the light source for the projector is a daylight temperature of approximately 5,500-6,000 Kelvin, for example. If the color temperature of the light source is different from the assumed color temperature, then the colors of the projected image may be inaccurate. If the color temperature of the light source is not correct, then the color temperature of the light source may be adjusted by dimming one or two of the colors relative to the remaining color(s). However, such an adjustment will result in a dimmer projected image than if all three colors are displayed at maximum intensity. In various embodiments, the partially transmissive regions of a shutter wheel can filter certain colors such that the colors of the image projected through the partially transmissive region are shifted. The 100% transmissive regions of the shutter wheel can project an image without shifting the colors. Again, since the shutter wheel rapidly switches between the 100% transmissive regions and the partially transmissive regions, the human eye and brain may combine the color shifted image and the image without color shifting into an image with a perceived color shift. By selecting the colors that are filtered out by the partially transmissive regions, the perceived color shift of the image can compensate for an inaccurate or incorrect color temperature of the light source.

In various embodiments, the partially transmissive regions can filter visible light (visible to the human eye), allowing invisible portions of the electromagnetic spectrum (e.g., ultraviolet or infrared) to pass through. As a result, an invisible portion of the electromagnetic spectrum of the projected image can be emphasized relative to a visible portion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A video projector for projecting images along a predefined path, the video projector comprising:
a light source;
an imaging circuit configured to receive light from the light source and to output images along the predefined path; and
a single shutter disposed in the predefined path, the shutter comprising a first region and a second region that are at least partially transmissive of visible light, wherein the second region is less transmissive than the first region,
wherein the shutter is operable according to a repeating sequence such that the output images are projected through the shutter to maintain a predefined perceived luminance, and
wherein, within the repeating sequence, the first region is positioned across an entirety of the predefined path and then the second region is positioned across the entirety of the predefined path.

2. The video projector of claim 1, wherein the shutter comprises a rotatable disk, wherein the first region is included in a plurality of first regions and the second region is included in a plurality of second regions, and wherein the first regions and the second regions are arranged around the rotatable disk in an alternating pattern.

3. The video projector of claim 1, wherein the second region comprises at least one filter configured to alter an electromagnetic spectrum of the images when the second region is positioned across the predefined path.

4. The video projector of claim 1, wherein the second region is between 50% and 90% transmissive.

5. The video projector of claim 1, wherein the first region of the shutter and the second region of the shutter are sequentially positioned across the predefined path during a time interval, wherein the first region is positioned across the predefined path for a shorter portion of the time interval than the second region.

6. The video projector of claim 5, wherein the first region is positioned across the predefined path for 25% of the time interval and the second region is positioned across the predefined path for 75% of the time interval.

7. The video projector of claim 1, wherein the first region of the shutter and the second region of the shutter are sequentially positioned across the predefined path during a time interval, wherein the first region is positioned across the predefined path for 50% of the time interval and the second region is positioned across the predefined path for 50% of the time interval.

8. A shutter for a video projector, the video projector comprising an imaging circuit configured to output images along a predefined path responsive to light received from a light source, the shutter comprising:
a rotatable disk comprising a plurality of first regions and a plurality of second regions that are arranged around the rotatable disk in an alternating pattern, wherein the first regions and the second regions are at least partially transmissive of visible light, wherein the first regions are more transmissive than the second regions,
wherein, when the rotatable disk is disposed with a predefined arrangement relative to the imaging circuit, rotation of the rotatable disk causes the output images to be projected through the rotatable disk to maintain a predefined perceived luminance, and
wherein, during the rotation of the rotatable disk, each of the plurality of first regions and each of the plurality of second regions are positioned across an entirety of the predefined path for a respective period.

9. The shutter of claim 8, wherein the second regions comprise at least one filter configured to alter an electromagnetic spectrum of images output by the video projector when the second regions are positioned in the predefined path.

10. The shutter of claim 8, wherein the second regions are between 50% and 90% transmissive.

11. The shutter of claim 8, wherein the second regions are between 60% and 80% transmissive.

12. The shutter of claim 8, wherein the second regions are between 70% and 75% transmissive.

13. A method for projecting a digital video image comprising a sequence of digital images and defining a brightness level for visible light of the digital video image, the method comprising:
displaying each digital image of the sequence for a respective predefined time interval, wherein each predefined time interval is divided into a first portion and a second portion;
during the first portion of the respective predefined time interval for each digital image, transmitting 100% of the brightness level for the visible light; and
during the second portion of the respective predefined time interval for each digital image, transmitting less than 100% and more than 0% of the brightness level for the visible light,
wherein lengths of the first portion and the second portion are selected such that the digital video image is projected to maintain a predefined perceived luminance.

14. The method of claim 13, wherein the first portion of each predefined time interval is between 25% and 50% of the predefined time interval.

15. The method of claim 13, further comprising:
operating a shutter according to a repeating sequence to alter a transmitted brightness level,
wherein, within the repeating sequence, a first region of the shutter is positioned across a display path for a first digital image of the sequence during the first portion of the respective predefined time interval, and
wherein, within the repeating sequence, a partially transmissive second region of the shutter is positioned across the display path for a second digital image of the sequence during the second portion of the respective predefined time interval.

16. The video projector of claim 1, wherein the second region comprises at least two different transmissiveness levels.

17. The video projector of claim 16, wherein the second region comprises a smooth transition between the two different transmissiveness levels.

18. The video projector of claim 3, wherein outputting images comprises outputting a plurality of primary color components, and
wherein the at least one filter of the second region is configured to alter the electromagnetic spectrum of the images by filtering a selected primary color component of the plurality of primary color components.

19. The video projector of claim 18, wherein filtering characteristics of the at least one filter are selected to provide a predefined color temperature.

* * * * *